United States Patent [19]

Pickens et al.

[11] Patent Number: 5,091,868

[45] Date of Patent: Feb. 25, 1992

[54] METHOD AND APPARATUS FOR FORMS GENERATION

[75] Inventors: David S. Pickens, Dunwoody; Susan G. Quinn, Lithia Springs, both of Ga.

[73] Assignee: Westcorp Software Systems, Inc., Atlanta, Ga.

[21] Appl. No.: 191,336

[22] Filed: May 9, 1988

[51] Int. Cl.⁵ .............................................. G06F 15/18
[52] U.S. Cl. .................................. 395/148; 340/206; 395/153; 395/149
[58] Field of Search ... 364/523, 518, 521, 900 MS File; 340/706, 712; 379/368

[56] References Cited

U.S. PATENT DOCUMENTS

| | | | |
|---|---|---|---|
| 3,872,462 | 3/1975 | Lemelson | 340/324 |
| 4,345,276 | 8/1982 | Colomb | 358/258 |
| 4,658,366 | 4/1987 | Posh | 364/523 |
| 4,715,006 | 12/1987 | Nagata | 364/523 |
| 4,755,955 | 7/1988 | Kimura et al. | 364/518 |
| 4,763,356 | 8/1988 | Day, Jr. et al. | 379/368 |

OTHER PUBLICATIONS

"Seven Hidden Costs of Every Form Your Company Uses, And How to Stop Paying Them." (12 pages).
"Formwriter Page Printing Systems from Electronic Form Systems" (5 pages).

Primary Examiner—Heather R. Herndon
Assistant Examiner—Phu K. Nguyen
Attorney, Agent, or Firm—Parkhurst, Wendel & Rossi

[57] ABSTRACT

A method and apparatus for forms generation is disclosed including a central workstation on which a form layout is designed with forms generation software, is used to generate an object code output program which corresponds to the form layout. The object code output program can be utilized by independent workstations to print forms without requiring each independent workstation to be equipped with the forms generation software used by the central workstation to design the form layout.

7 Claims, 13 Drawing Sheets

FIG. 1

| | |
|---|---|
| 1 | CREATE FORM<br>USE EXISTING SOFTWARE PRODUCTS<br>TO<br>GENERATE FORM DISK FILE |
| 2 | MAKEMAC PROGRAM<br>(DISK MACRO AND INSTRUCTIONS)<br><br>READS THE FORM INPUT DISK FILE.<br>CREATES A FORM MACRO DISK FILE.<br>CREATES A FORM INSTRUCTION DISK FILE. |
| 3 | MAKESCREEN PROGRAM<br>(SCREEN AND KEY ENTRY)<br>ALLOWS KEYBOARD ENTRY OF SCREEN DESIGN.<br>GENERATES A SCREEN LAYOUT DISK FILE.<br>CALCULATES KEYIN POSITIONS OF DATA VARIABLES.<br>ALLOWS KEY ENTRY OF DATA TYPES.<br>ALLOWS KEY ENTRY OF DATA DEFINITIONS.<br>GENERATES A SEQUENTIAL DISK FILE OF DATA VARIABLES.<br>UPDATES FORM INSTRUCTIONS DISK FILE WITH DATA<br>POSITION PLACEMENTS.<br>DATA TYPES, AND DATA DESCRIPTIONS. |
| 4 | MAKEPROG PROGRAM<br>(SOURCE AND OBJECT CODE GENERATION)<br>ALLOWS SELECTION OF AVAILABLE 'PHASE' PROGRAMS.<br>READS FORM INSTRUCTION DISK FILE AND DATA VARIABLES<br>DISK FILE.<br>GENERATES SOURCE CODE PROGRAM CONTAINING:<br><br>01. SCREEN DISPLAY DATA AREA.<br>02. DATE AND WORK VARIABLES.<br>03. TEMPORARY FONT WORK FILES.<br>04. PRINTER DOWNLINE LOAD ROUTINE.<br>05. PAGE SLEW DOWNLINE LOAD ROUTINE.<br>06. DATA KEY ENTRY VARIABLES.<br>07. PRINT POSITIONS AND FONTS.<br>08. SCREEN DISPLAY STATEMENTS.<br>09. DATA ENTRY KEYIN STATEMENTS.<br>10. MACRO AND DATA PRINT LOADER.<br><br>COMPILES THE GENERATED SOURCE CODE INTO OBJECT<br>CODE<br>AND EXECUTES THE FINISHED PROGRAM FOR FINAL<br>TESTING. |

FIG. 2

| FIELD NAME | DEF. | LENGTH (BYTES) | DESCRIPTION |
|---|---|---|---|
| VERSION | DIM | 8 | VERSION NAME |
| DATE | DIM | 6 | DATE |
| TIME | DIM | 6 | TIME |
| PFILE | DIM | 3 | PRINTER NAME AS CONFIGURED |
| FIL1 | DIM | 1 | N/A |
| PAGETYPE | DIM | 4 | N/A |
| NUMN01 | FORM | 8 | |
| NUMN02 | FORM | 8 | INDICATE POSITION OF ESCAPE |
| NUMN03 | FORM | 8 | SEQUENCES FOR THE SPECIFIC PRINTER |
| NUMN04 | FORM | 8 | AS DEFINED BY PFILE FIELD |
| NUMN05 | FORM | 8 | |
| NUMN06 | FORM | 8 | BEGINNING POSITION FOR THE MACRO |
| NUMN07 | FORM | 8 | BEGINNING POSITION FOR THE DATA FIELD INFORMATION |
| NUMN08 | FORM | 8 | BEGINNING POSITION FOR THE FONT INFORMATION |
| NUMFONTS | FORM | 4 | NUMBER OF FONTS FOR THIS FORM |
| HEAD | DIM | (VAR.) | N/A LENGTH DEFINED BY NUMN01 - 96 |
| NUM8(a) | FORM | 8 | NUMBER OF BYTES IN HEADER FIELD |
| HEADER | DIM | (VAR.) | PRINTER ENVIRONMENT FIELD LENGTH DEFINED BY NUM8 (a) |
| SKIP | DIM | (VAR.) | VALUE OF NUMN08 MINUS NUMBYTES (NUMBYTES = NUMN01 + '8' + NUM8(a) |
| FONTNAME | DIM | 8 | FONTNAME |
| FIL5 | DIM | 5 | N/A |
| FONTW | FORM | 8 | FONT WIDTH |
| FONTH | FORM | 8 | FONT HEIGHT |
| TABLE | FORM | 8 | FONT WIDTH TABLE SIZE |
| FILL11 | DIM | 11 | N/A |
| NUM8(e) | FORM | 8 | SIZE OF FONT ESCAPE SEQUENCE DESCRIPTION |
| FONT | DIM | (VAR.) | VALUE OF NUM8(e), REPRESENTS THE FONT ESCAPE SEQUENCE DESCRIPTION |
| NUM4(b) | FORM | (VAR.) | N/A LENGTH DEFINED BY TABLE/4 |
| NUM8(f) | FORM | 8 | SIZE OF THE MACRO |
| SCRATCH(a) | DIM | (VAR.) | MACRO DATA LENGTH DEFINED BY INTEGER VALUE OF NUM8(f) DIVIDED BY 128, MULTIPLIED BY 128 |
| SCRATCH(b) | DIM | (VAR.) | MACRO DATA LENGTH DEFINED BY REMAINDER OF NUM8(f)/128 |
| NUM8(g) | FORM | 8 | NUMBER OF FIELDS FOR THIS FORM |
| INNAME | DIM | 20 | FILED NAME |
| INXPOS | DIM | 6 | X COORDINATE PRINT POSITION |
| INYPOS | DIM | 6 | Y COORDINATE PRINT POSITION |
| INLENG | DIM | 4 | LENGTH OF FIELD |
| FIL4 | DIM | 4 | N/A |
| INFONT | DIM | 4 | FONT NUMBER |
| INJUST | DIM | 4 | JUSTIFICATION |
| FIL8 | DIM | 8 | N/A |
| FIL4 | DIM | 4 | N/A |

| THE VALUES CONTAINED IN THE INSTRUCTION FILE ARE AS FOLLOWS: | | | |
|---|---|---|---|
| INSSEQ | ALPHA/NUMERIC | 4 BYTES | FIELD SEQUENCE NUMBER (INCREMENTAL) |
| INSDES | ALPHA/NUMERIC | 14 BYTES | FIELD DESCRIPTION (USER DEFINED) |
| INSRCD | ALPHA/NUMERIC | 2 BYTES | FIELD DATA TYPE (ALPHA/NUM-NUMERIC-DATE, TIME, PROGRAM GENERATED ALPHA/NUMERIC OR PROGRAM GENERATED NUMERIC) |
| INSHZL | ALPHA/NUMERIC | 2 BYTES | HORIZONTAL SCREEN PLACEMENT (MAKESCR) |
| INSVTL | ALPHA/NUMERIC | 2 BYTES | VERTICAL SCREEN PLACEMENT (MAKESCR) |
| INSFLD | ALPHA/NUMERIC | 8 BYTES | FILED NAME (FROM FORM DISK FILE) |
| INSTYP | ALPHA/NUMERIC | 1 BYTE | FIELD TYPE (1=PRINTER ENV 2=FORM INFO 3=SLEW INFO 4=DATA RECORDS) (MAKEMAC) |
| INSLTH | ALPHA/NUMERIC | 4 BYTES | SIZE OF FIELD (FORM DISK FILE) |
| INSJUS | ALPHA/NUMERIC | 1 BYTE | FIELD JUSTIFICATION (0=L 2=R) (MAKEMAC) |
| INSHTH | ALPHA/NUMERIC | 4 BYTES | FONT HEIGHT IN POINTS (FORM DISK FILE) |
| INSWDT | ALPHA/NUMERIC | 4 BYTES | FONT WIDTH IN POINTS (FORM DISK FILE) |
| INSJST | ALPHA/NUMERIC | 1 BYTE | FONT JUSTIFICATION (0-NO 1=YES) (FORM DISK FILE) |
| INSFNT | ALPHA/NUMERIC | 8 BYTES | FONT FILE NAME (FORM DISK FILE) |
| INSCTL | ALPHA/NUMERIC | 25 BYTES | FONT PRINT SEQ (FORM DISK FILE) |
| INSPOS | ALPHA/NUMERIC | 64 BYTES | PAGE PRINT POSITION (FORM DISK FILE) |

FIG. 7

METHOD AND APPARATUS FOR FORMS GENERATION

BACKGROUND OF THE INVENTION

The present invention relates to the field of electronic publishing systems employed for forms generation. In particular, the invention relates to a system and method for generating an object code output program that corresponds to a desired form to be printed/

Many businesses today use a variety of preprinted forms such as invoices, credit and debit notes, checks, petty-cash slips, etc., that are relatively expensive on a per transaction basis. The expense of the preprinted forms stems from the requirements of individually designing the form, printing expenses, and storage space for storing a ready supply of the forms. Expenses are also incurred every time a minor change is made to a standard preprinted form which requires the supply of old forms be destroyed. In additional, manual entry errors result in a large number of forms being discarded.

With the advent of readily available personal computers and word processing software, some attempts have been made to deal with the problem of expensive waste of preprinted forms. For example, many word processing software packages permit the user to set up a screen format that allows the user to fill in form information (such as data variables), on the screen, correct for errors, and print the form information on a preprinted form. While such packages reduce waste due to manual entry errors, they still require the use of preprinted forms which must be manually loaded to a printer. Thus, effort is constantly wasted by manually switching the type of preprinted forms being loaded in the printer, or printer resources are wasted by dedicating certain printers to print particular forms.

The recent introduction of laser printers and desktop publishing software packages have provided a partial solution to the problem of preprinted forms, namely, the entire form can be generated and printed by the desktop publishing software package eliminating the need for preprinted forms. For example, XEROX Corporation offers a desktop publishing software package called Ventura Publishing that permits the creation of a document containing both text and graphics which may be printed on a laser printer.

Desktop publishing systems, however, inherently contain a major drawback to their use as forms generating systems, namely, they generally produce a document file which includes text and graphics data, page layout information, etc., that can only be accessed and utilized through the use of the particular desk top publishing software employed to create the document file. In situations where a central office employs desktop publishing software to create a standardized invoice form document file, each branch office that wishes to use the document file must purchase the desktop publishing software. In fact, under most licensing agreements, a separate desktop publishing software package has to be purchased for each workstation at the branch office on which the document file is to be utilized. Thus, while current desktop publishing systems may be helpful in reducing the problem of preprinted forms, the expense of purchasing desktop publishing software for each workstation makes the use of such software as a forms generation system prohibitive.

SUMMARY OF THE INVENTION

The present invention is based on the recognition that independent workstations need only provide the capability of displaying a previously prepared form file, filling in designated form data variables, and printing the result on a printer. The actual formatting and design of the form file can be prepared on a central workstation having design capability. Accordingly, the present invention overcomes the above-described limitations and disadvantages by providing a method and apparatus for forms generation that provides an object code output program which corresponds to a particular form. The object code output program can be utilized by independent workstations to generate the corresponding form without requiring each workstation to be equipped with a licensed applications software package.

DESCRIPTION OF THE DRAWINGS

With the above as background, a preferred exemplary embodiment will hereinafter be described in conjunction with the appended drawings in which:

FIG. 3 illustrates a form disk file that may be employed in the present invention;

FIG. 4 comprising

FIG. 5 comprising FIGS. 5A–5B illustrates a general flow diagram of a MAKESCREEN program incorporated by the central workstation illustrated in FIG. 1;

FIG. 6 comprising

DETAILED DESCRIPTION OF THE PREFERRED EMBODIMENTS

Figure 1:
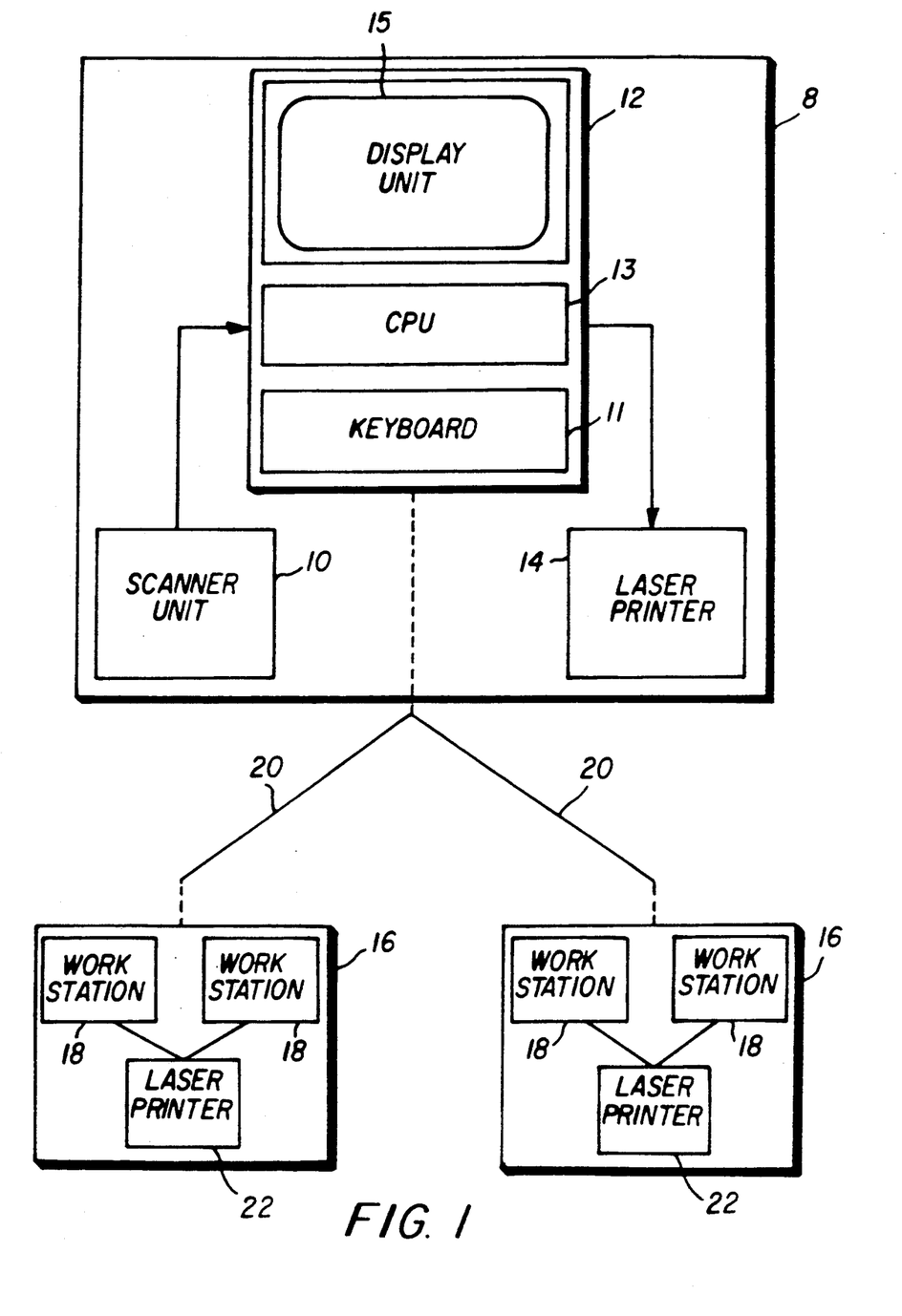
FIG. 1 illustrates, an overall block diagram of a system according to the present invention.

Referring now to FIG. 1, a simplified block diagram of a forms generation system according to the present invention is illustrated. A central office 8, for example a bank's main office, is provided with a central workstation 12 which is utilized to design a form layout. The central workstation 12 includes a keyboard 11, a CPU 13 and a display unit 15 and is preferably linked to a scanner unit 10 to enable graphic symbols, such as the bank's logo, to be scanned and incorporated in the form layout. A laser printer 14 (for example, an Hewlett Packard Laserjet Series II) is also coupled to the central work station 12 to permit the printing and proofing of the final form layout. The central workstation 12 may comprise, for example, a personal computer such as a Datapoint Starport system having a 1.2 megabyte floppy drive and a 20 megabyte hard disk. As will be discussed in greater detail below, the central work station 12 generates an object code output program for each form generated. The object code output program is then transmitted via data links 20 to individual workstations 18 at various branch offices 16. Alternatively, the object code output program can be stored on a disk and supplied to the branch offices 16. A user at each individual workstation 18 may then utilize the object code output program to display the form layout, fill in data fields, and print the completed form on laser printers 22 which are coupled to the individual workstations 18 (also having a keyboard, CPU and display unit). The individual workstations 18 may be of the same hardware configuration as the central workstation 12, but this is not required. The individual workstations 18 need only be equipped with an interpreter capable of reading the object code output program.

In the system illustrated in FIG. 1, in contrast to conventional desktop publishing systems, the central workstation 12 is the only workstation that needs the capability of designing the form format. The object code output program generated by the central workstation 12 may be independently run on the individual workstations 18 in order to display the form, fill in the form, and print the form. The object code output program may also be interfaced with existing data processing and applications programs. The expense of providing each individual workstation 18 with forms generation software is thereby avoided.

Figure 2:
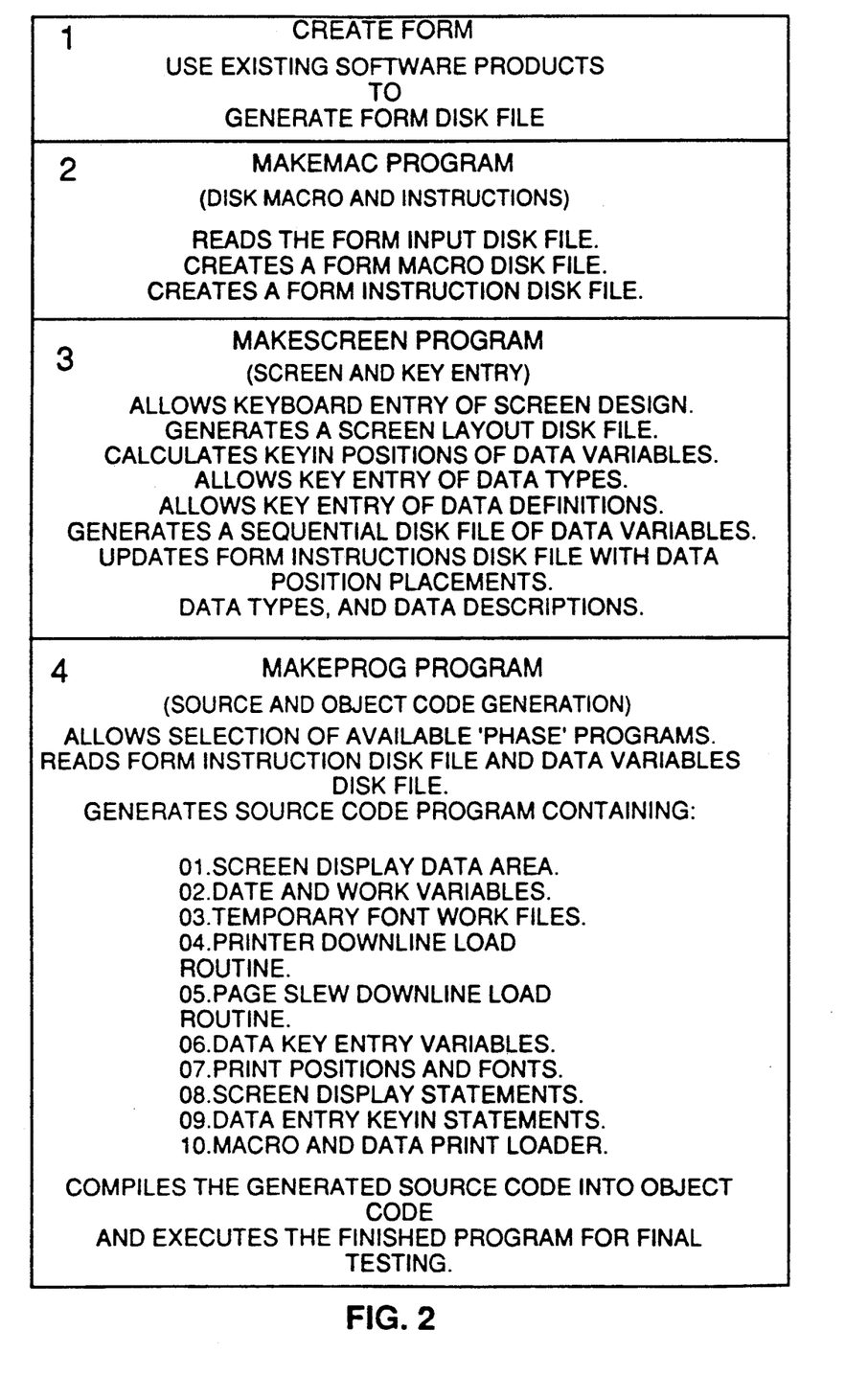
FIG. 2 illustrates a basic process flow diagram of the operation of a central workstation provided in the system illustrated in FIG. 1.

A general flow diagram of the operation of the central workstation 12 is illustrated in FIG. 2. A form creation program is used to design a particular form layout on the display 15 of the central workstation 12 and generate a form disk file containing form field data, font data, and printer environment data information for the form layout. For example, commercially available software packages such as IPRINT by INDIGO SOFTWARE LTD. may be employed as the form creation program to generate the form disk file. The IPRINT software package permits the creation of a form containing both text and graphics information and allows the user to layout various form configurations. The form disk file is then read by a MAKEMAC program that creates a macro disk file containing printer environment data, page size data, page slew data, form text and graphics data (print positions etc.), data variable field name, data variable field font and data variable field placement. If one wanted to generate a program that just generated a form without permitting entry of data variables, the data variable entry information would not be required. An instruction disk file containing the information in the macro disk file in addition to data variable field description, data variable name, horizontal and vertical screen placements. Next, a MAKESCREEN program is employed to generate a screen design which will be displayed on the display units of the individual workstations 18. The MAKESCREEN program calculates key-in entry positions for data variables, permits entry of data types and data definitions, and generates a screen layout disk file and a sequential disk file for data variables. The MAKESCREEN program also updates the instruction disk file with screen position placements, data types, and data descriptors. A MAKEPROG program is then utilized to read the instruction disk file and the data variables disk file and generate a source code program which will display the screen layout generated with the MAKESCREEN program, permit users to enter data variables into the screen layout, and print the completed form. The MAKEPROG program then compiles the source code program to generate an object code output program that is supplied to the individual workstations 18. The end user may then utilize the object code output program to generate as many forms as desired.

As previously mentioned, commercial software products such as IPRINT may be employed to generate the form disk file. The form disk file generated by the IPRINT software consists of variable length record having a number of fields defining header information, printer environment data, form text and graphics data, etc., and is illustrated in detail in FIG. 3. The discussion below will be based on the use of IPRINT software to create a form layout and generate a form disk file. Fields that are not utilized by the MACMAC program are defined as not applicable (N/A). IPRINT also has the capability of incorporating graphics data generated by graphics software (for example PUBLISHER'S PAINTBRUSH produced by Z-SOFT Corporation) using the scanner unit 10. It will be readily understood by those of ordinary skill in the art, however, that other commercial software packages may be employed to generate a form disk file and that the MAKEMAC, MAKESCREEN, and MAKEPROG programs would have to be modified accordingly.

With the above as background, a more detailed explanation of each of the process steps employed by the central workstation 12 will be discussed with reference to FIGS. 4–6, which respectively, illustrate general flow diagrams of preferred MAKEMAC, MAKESCREEN and MAKEPROG programs, although the above is sufficient to enable one of ordinary skill in the art to generate the programs. The preferred programs are generated in the Databus programming Language, although other languages may be readily employed.

MAKEMAC

Figure 4A:
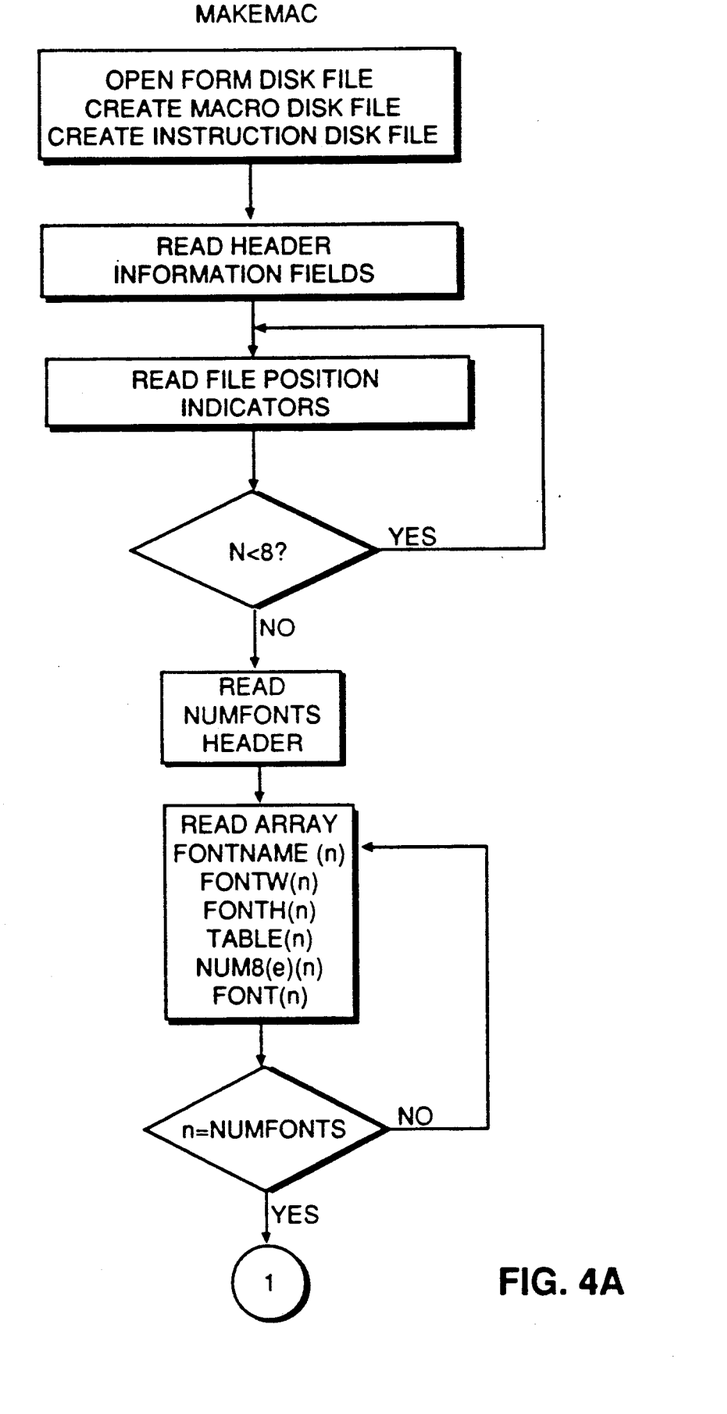
FIGS. 4A–4C illustrates a general flow diagram of a MAKEMAC program incorporated by the central workstation illustrated in FIG. 1.
Figure 4B:
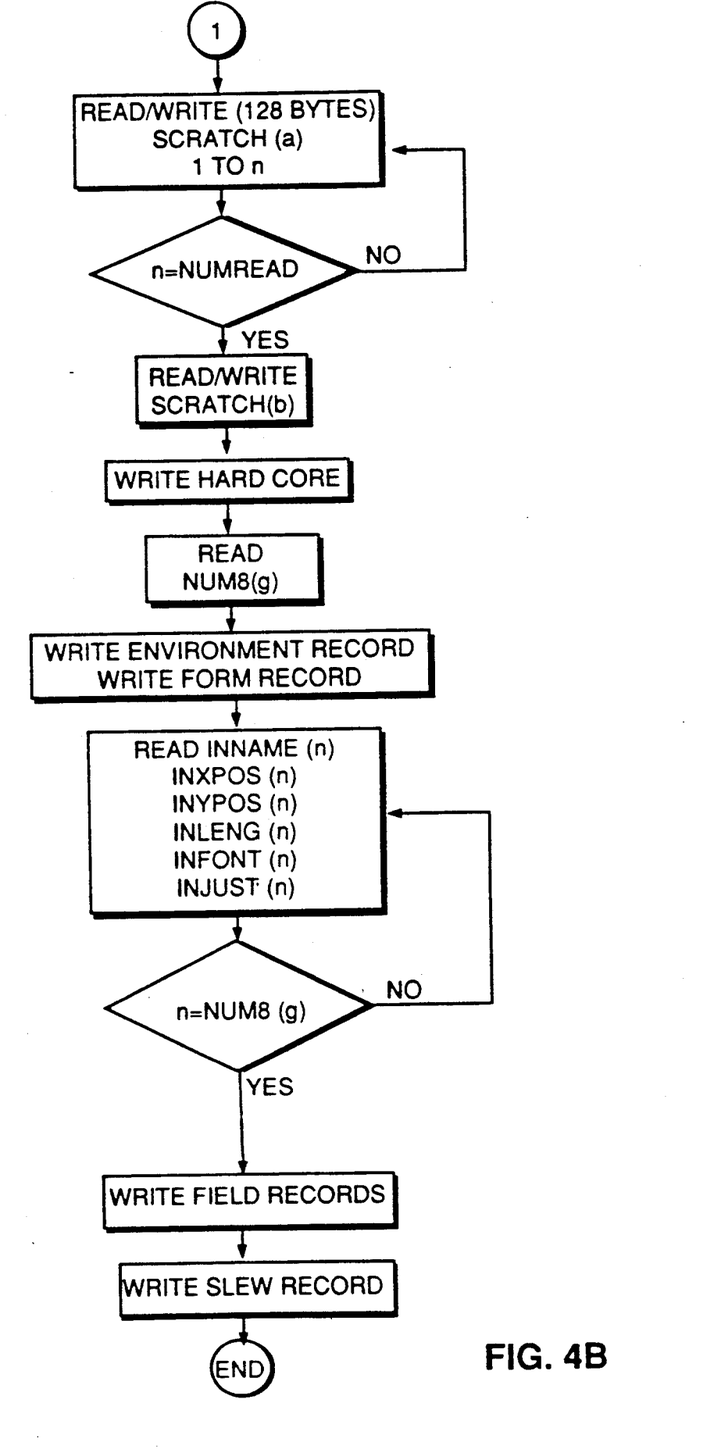
Figure 4C:
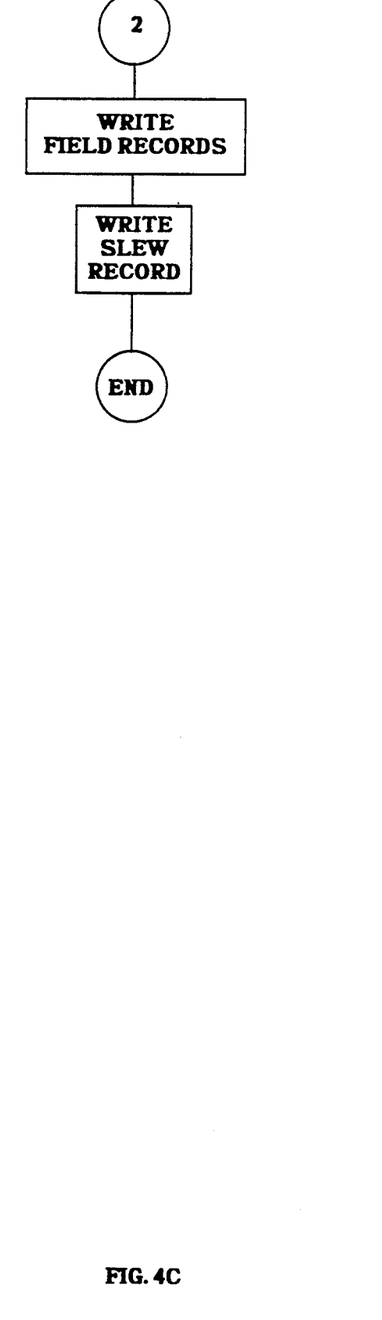

Referring now to FIG. 4, the MAKEMAC program opens the disk form file and creates a macro disk file and an instruction disk file and reads header information from the form disk file. In the case of an IPRINT file, the header information consists of the first six fields—VERSION, DATE, TIME, PFILE, FIL1 PAGETYPE—of the form disk file. The first three fields and the last field are information fields which are not utilized. The field "PFILE" identifies the system printer configuration. A loop routine is then used to read the next eight fields—designated NUMNO(n) each consisting of eight bytes—which are file position indicators. The first five fields (NUMNO(1)–NUMNO(5)) are file position indicators for the escape sequences for specific printers defined by the PFILE field, NUMNO(6) is the start position for the page overlay information of the form disk file, NUMNO(7) indicates the beginning of field information, and NUMNO(8) is the start position of font information tables (including width tables for proportional fonts).

The next field read from the form disk file, NUMFONTS consisting of four bytes, indicates the number of fonts used for the particular form. Next, the field NUM8(a) is read by skipping over the field HEAD which has a length defined by NUMNO01 minus the literal "96". NUM8(a) defines the number of bytes in the field HEADER which contains the printer environment data. The field HEADER is read by reading the number of bytes defined by NUM8(a). An array of the fields FONTNAME, FONTW, FONTH, TABLE, NUM8(e), and FONT is then read by first skipping over the information contained in the field SKIP, the length of which is defined by the result of the subtracting the value of a workfield NUMBYTES (defined by the value of NUMN01+8+NUM8(a)) from the value of NUMNN08. The length of the array is defined by the field NUMFONTS. The font table information contained in the field NUM4(b), the length of which is defined by TABLE divided by the literal "4", is then skipped to read NUM8(f) which is the size of the form disk file macro. The macro data is then read from fields SCRATCH(a) and SCRATCH(b). A loop routine is performed to read the field SCRATCH(a) 128 bytes at a time and write the information to the macro disk file. The number of reads required to read the field Scratch(a) is defined by a workfield NUMREAD which is the integer result of NUM8(f) divided by 128. An operation is then performed to read SCRATCH(b), the length of which is defined by multiplying NUMREAD by and subtracting the result from NUM8(f), and writing the information to the macro disk file. The field NUM8(g) is then read which defines the number of fields for the form. The MAKEMAC program then writes hard coded data such as header information, printer escape sequences, form number, etc., to the macro disk file. The MAKEMAC program is now ready to generate the instruction disk file.

Figure 7:
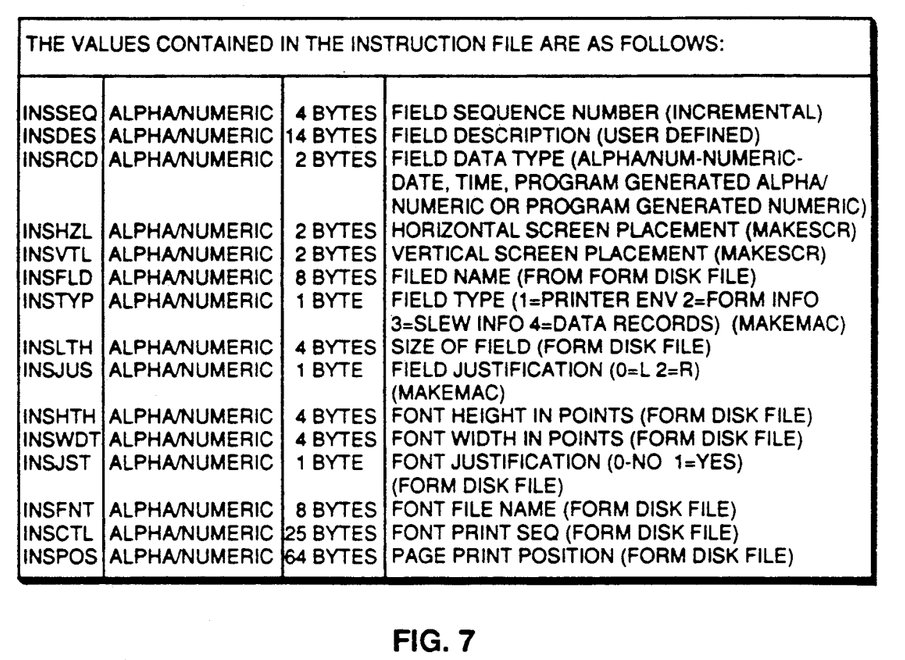
FIG. 7 illustrates a table defining fields contained in the instruction file generated by the MAKECMAC program.

The instruction disk file is preferrably ISAM (Index Sequential Access Method) and the fields contained in the instruction disk file are illustrated in FIG. 7. The instruction disk file contains four record types: an environment record (1), a slew record (2), form record (3), and field records (4). The environment record is then written to the instruction disk file with the following information:
INSFLD="ENV" (Left Justified and Space Filled, Hardcoded)
INSTYP="1"
INSPOS=HEADER (Left Justified and Space Filled, from form disk file)
INSSEQ="0010" (used by MAKEPROG for key-in generation)
The form record is then written to the instruction disk file (S15) with the following information:
INSFLD="FORM" (Left Justified and Space Filled)
INSTYP="3"
INSHTH=NUMREAD
INSWDT=NUMREC
INSSEQ="0020"

A loop routine is used to read the fields INNAME, INXPOS, INYPOS, INLENG, INFONT, and IN-JUST. This loop is executed the number of times as indicated by NUM8(g). Within this loop, INFONT is moved to a workfield called OUTFONT and OUTFONT is incremented by one to become the font ID number. This font ID number is the index of the font array previously extracted from the form disk file with includes: FONTNAME, FONTW, FONTH, FONT, JUSTFONT. The INSSEQ field is incremented by "10" for each read and the Y coordinate of the data print position is recalculated by adding the field FONTH(OUTFONT) to the field OUTYPOS. The INNAME field is passed through a filter routine to eliminate any nul characters before being moved to the INSFLD field. The generation of a filter routine would be readily apparent to one of ordinary skill in the art. The field records are then written with the following information:
INSTYP="4"
INSLTH=INLENG
INSJUS=INJUST
INSFLD=INNAME
INSFNT=FONTNAME(OUTFONT)
INSCTL=FONT(OUTFONT)
INSWDT=FONTW(OUTFONT)
INSHTH=FONTH(OUTFONT)
INSJST=JUNSTFONT(OUTFONT)
INSSEQ=INCREMENTS of "10"
INXPOS=OUTXPOS
INYPOS=OUTYPOS+FONTH(OUTFONT)
INSPOS=ESC CHAR "*p", OUTXPOS, "x", OUTYPOS, "Y"

Once the loop has been completed, the slew record is written to the end of the instruction disk file. The slew record is written with the following information:
INSSEQ=INCREMENTED BY "10"
INSTYP="4"
INSFLD="SLEW"
INSPOS=ESC CHAR, "&f", macro number, "y2x", ESC CHAR, "&10", SPACE FILLED
The form disk file and instruction disk files are then closed.

MAKESCREEN

Figure 5:
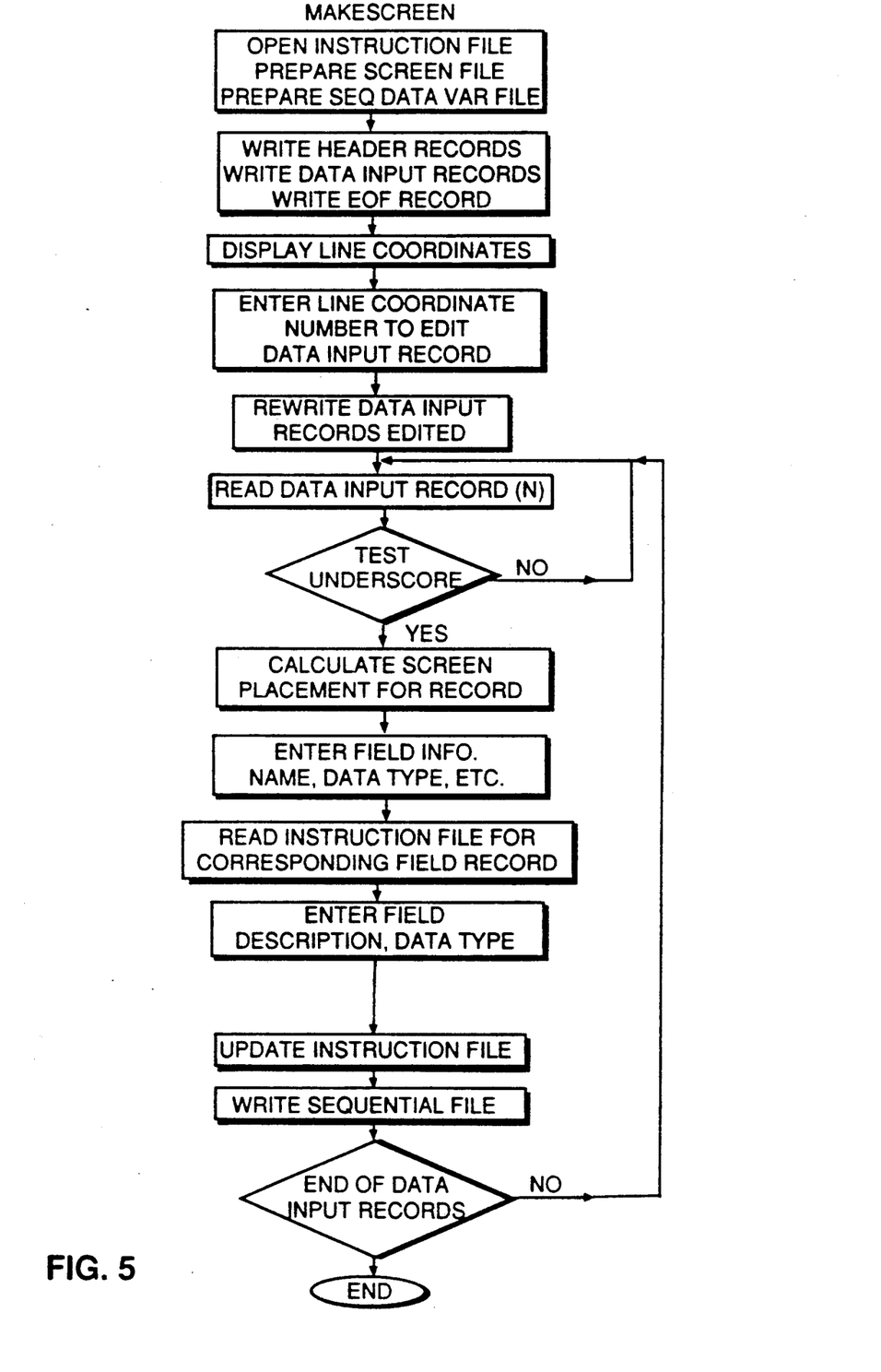
Figure 6A:
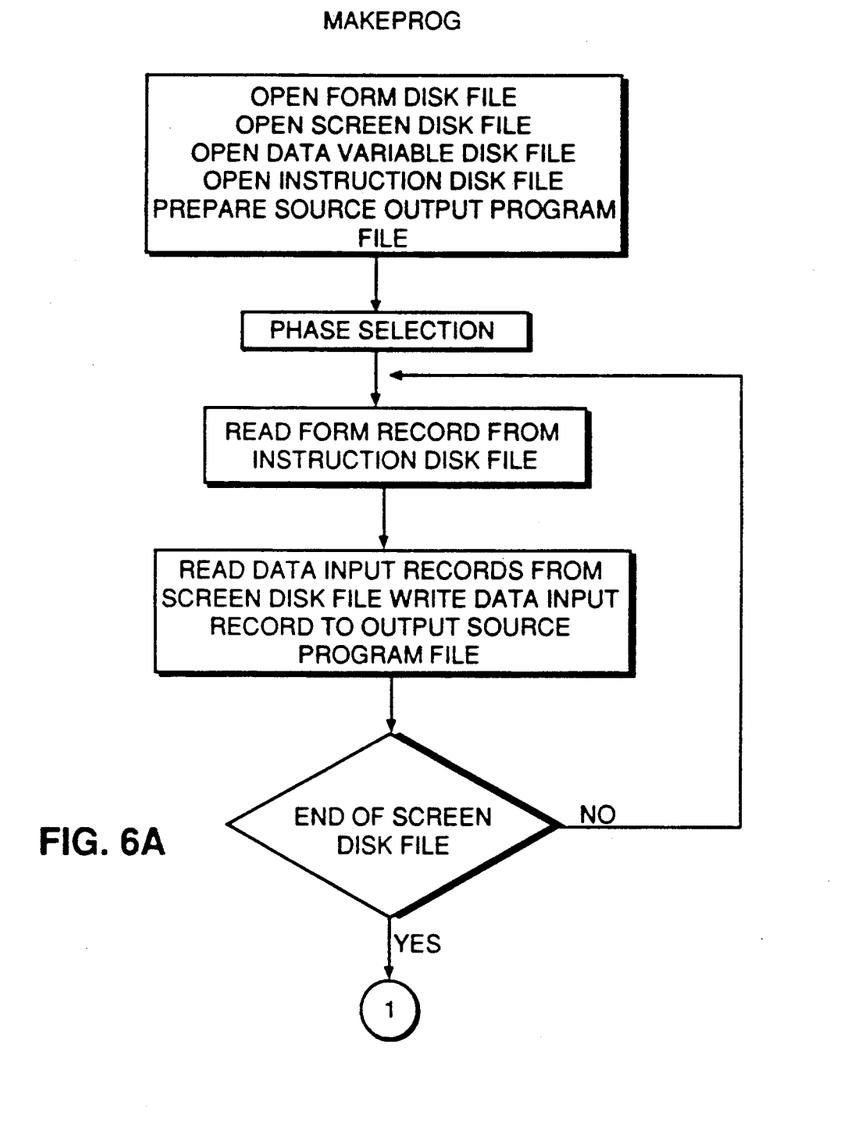
FIGS. 6A–6E illustrates a general flow diagram of a MAKEPROG program incorporated by the central workstation illustrated in FIG. 1.
Figure 6B:
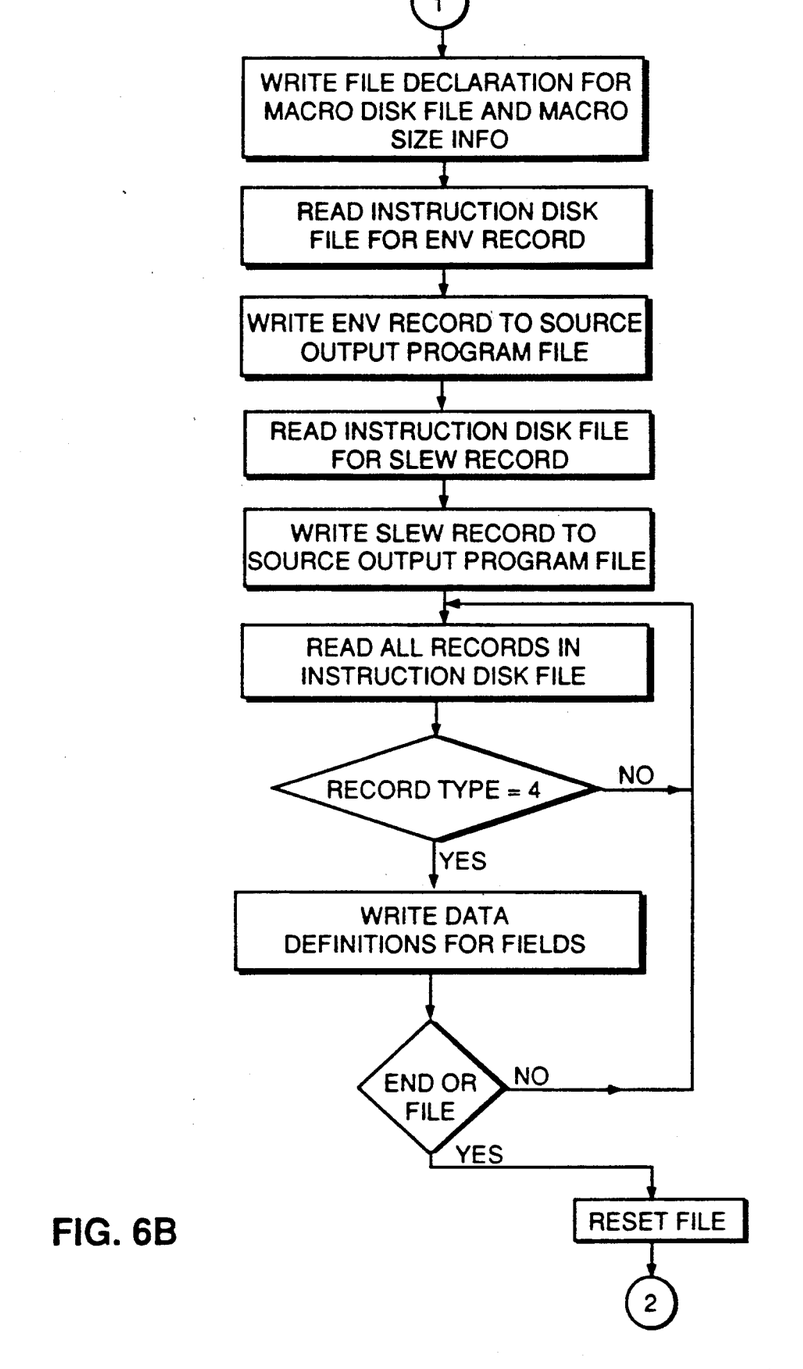
Figure 6C:
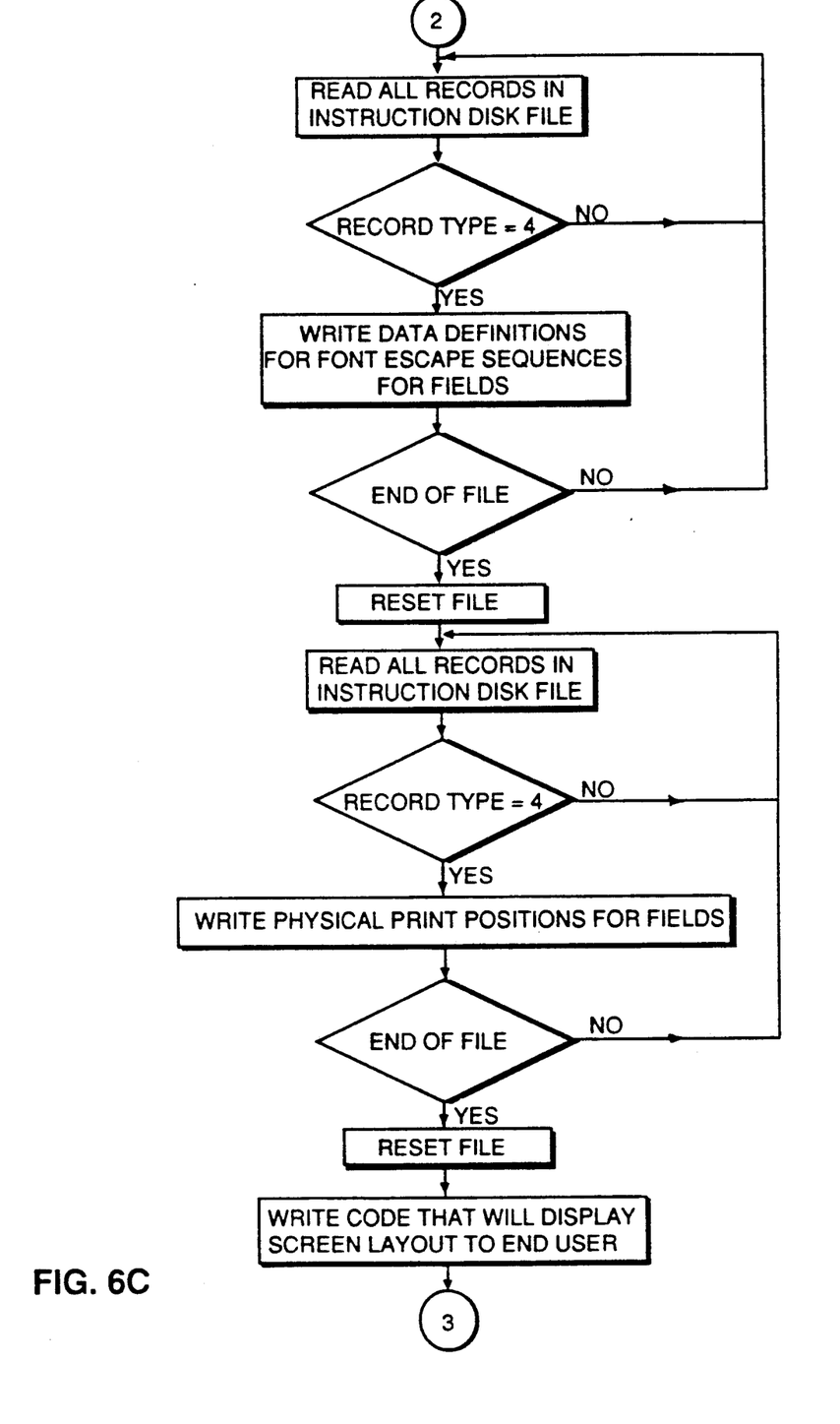
Figure 6D:
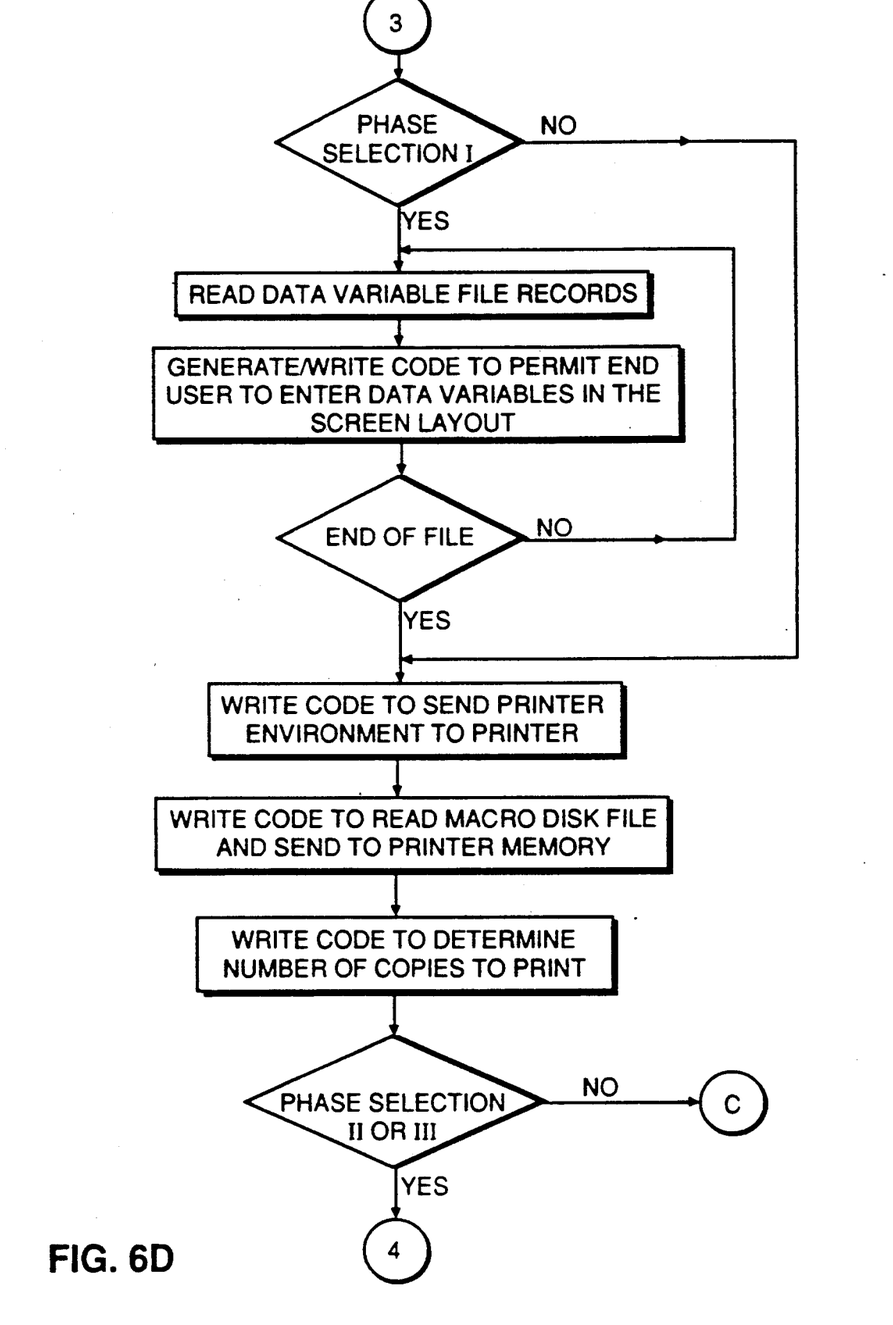
Figure 6E:
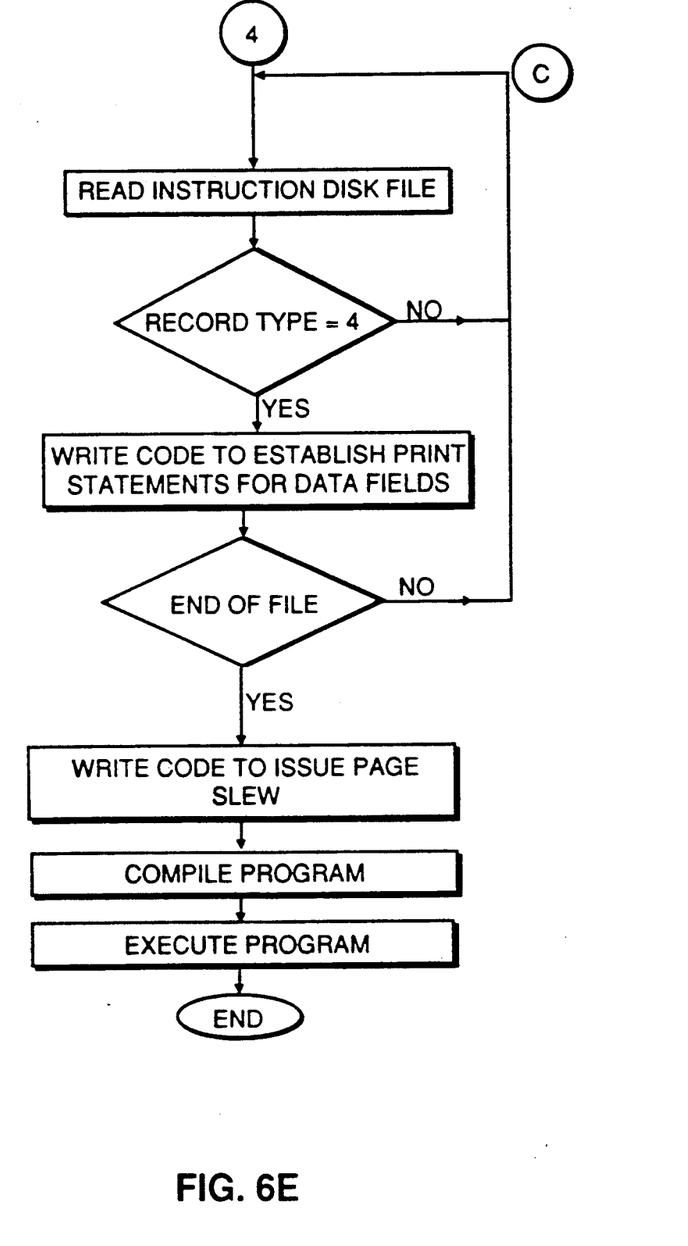

Refering now to FIG. 5, the MAKESCREEN program generates a screen disk file that defines a display screen to be used by the end user to fill in the form fields. The program begins by opening the instruction disk file, prepares a screen disk file, a sequential data variable file and writes records containing header information to the screen disk file. Next, a number of data input records corresponding to the number of lines to be used in the screen display are written to the screen disk file. The blank data input records are defined by a vertical bar, 78 spaces, and a vertical bar. An end of file record is then written to the screen disk file and the file is closed.

Line coordinates are then displayed in the first vertical position of each line of the display 15 of the central workstation 12. The user is prompted to indicate which line is to be edited by inputting a line coordinate. The user may then key in any desired information on the line selected. The location of data variables to be entered by the end user of the output object code program are indicated by placing an underscore in the desired position. Once the user has generated the desired screen layout, the data input records of the screen disk file are rewritten to include the information entered by the user.

A loop is then established to read all data input records. Starting with a formpointer positioned at the first byte of the data input record, the record is scanned for an underscore character which indicates the placement for the data variables. If an underscore is found in a data input record, the position of the underscore is calculated and moved to field HP which indicates the horizontal position of the data variable to be entered. A further check is made to determine if the field is a date or time field. If the test is true, the literal number "8" is added to a field called HA. If the field is neither a date nor a time field, each character of the field is matched one by one to determine the length of the underscore which is moved to field HA.

The program then takes the value of field HP and moves it to a field called FP, and adds the value of field HA to the value of field FP. The formpointer for the data input record is set to the value of FP and a lengthpointer set to the value of HA. The underscore is moved to a workfield called string which is then displayed on the display screen 15 at the calculated values of HP and VP (vertical position determined by the coordinate selected).

The program then prompts the user for the field name, which is the same name (INSFLD) located in the instruction disk file (ISAM KEY), to the read the fields from the instruction disk file. The user enters a field description and the program checks to see if the actual field length exceeds the screen width by adding the field INSLTH (length of the field as read from the instruction file) to the field HP (starting horizontal position) and comparing the result to the actual screen width. If the screen width is exceeded, the user generating the screen layout is notified. The user then enters the data type for the field: FM=FORM (Numeric Data), DM=DIM (Alpha/Numeric data), DT DATE, PF Program Generated Form (no key entry), PD=Program Generated DIM (no key entry).

The field HP is moved to the field INSHZL, the field VP is moved to the field INSVTL, a literal "1" is added to the field INSSEQ, the instruction disk file is updated and the sequential data variable disk file is then written. The MAKESCREEN program is completed after all data records out of the screen disk file are read and processed, the instruction disk file is updated and the sequential disk file is written according to the sequential number.

MAKEPROG

The MAKEPROG program generates an object code output program for each form and allows the end user to select from three phases of program generation. Phase I generates a program that will print a form with no data variables. Phase II generates a program that will allow an operator to key in variables in IO the screen layout (generated from MAKESCREEN) and produce a form with the data variables included. Phase III produces a program that will allow an operator to key in variables in the screen layout, retain this information in a disk file and allow maintenance to be performed on the record prior to printing.

The MAKEPROG program checks to see if the necessary files are present to generate the object code output program and prepares a source output program file. The necessary files include the instruction disk file (generated from MAKEMAC and updated by MAKESCR), the macro disk file (generated from MAKEMAC), the screen disk file (generated from MAKESCREEN), and the sequential disk file (generated from MAKESCREEN). All files must be found in order to continue processing.

Once all files are found and opened, the fields are read from the form record contained in the instruction disk file. A loop is then established to read the data input records from the screen disk file sequentially. As the records are being read from the screen disk file, the source output program file is being written with the fields contained in the data input records in the form of data area definitions. Each record is read and written until the end of the screen disk file in encountered. For example, record four from the screen disk file "ACCOUNT NUMBER_" would appear in the program as "DL03 INIT "ACCOUNT NUMBER_". As each record is being read from the screen disk file, a counter is incremented by "1" and attached to a constant variable DL thus producing a unique data area definition for each screen record.

The file declaration and data area for the reading of the macro file are now written to the source output program disk file. This also includes the name of the macro disk file, and the number of whole 128 byte reads and the number of leftover bytes to be read (As obtained from reading the form record in the instruction disk file).

The instruction disk file is then reopened and is read for the environment record (generated in the MAKEMAC program). The field INSPOS is unpacked into two 32 byte records called DIM 32a and DIM 32b. This is because the output program disk file is a Databus format program that uses columns 1-9 for labels, columns 10-19 for verbs and columns 20-79 for instructions. Instructions may be extended to the next line by the use of the colon. The value of INSPOS belongs in the instruction column. The field INSPOS is 64 bytes long and even though it may not be completely filled with instruction data, the possibility does exist; therefore, the record is divided into two parts with a colon after the first line that will extend the instruction to the second line. The record is written out with the label ENV, the verb INIT and the value of DIM 32A and DIM32B as the instructions. Only the logical length of the value in the fields is written (no leading or trailing spaces).

The instruction disk file is now read for the slew record (generated by the MAKEMAC program). The same process is applied for the slew record as for the environment record with the label being "SLEW". record.

The instruction disk file is repositioned to the beginning and a loop is established to start reading each record in the instruction disk file. During this process, the record type is checked to determine if the record is valid. Only type "4" records are to be processed. If an invalid data type is encountered, a flag is set and the data type is set to DIM. If the data type is DM, PD, DT, or TM, the program operation is transferred to the program section that writes the data area definition for an alpha/numeric field. If the data type is FM or PF, the program transfers to the section which will write the data area definition for numeric fields.

The alpha/numeric data area definition for data records is accomplished by writing the value of the field INSFLD as the label, literal DIM as the verb, and the value of the field INSLTH as the size of the data area. This information is written to the output program file for each alpha/numeric data record read from the instruction disk file. For example, "ACCOUNT DIM 06". The numeric only data area definition for data records is accomplished by separating the field INSLTH into two two-byte alpha/numeric fields and then moving the second two byte field to a two byte number field called FORM02. The literal "3" is subtracted from this value. The information is written to the output program disk file with the value of the field INSFLD as the label, literal FORM as the verb, the value of FORM02 as the size and a literal "0.2" as the remainder of the size. This information is written to the output program file for each numeric data record read from the instruction disk file. For example, "AMOUNT FORM 6.2".

The instruction file is closed and reopened to reposition to the beginning of the file. The instruction file is now processed to obtain font escape sequences and the physical placement of the data variables on the form. This information is written as a data area in the output program disk file which is accomplished by establishing a loop to read each record from the instruction disk file. A check is made for the type of record read, as only record type "4" is to be processed. If the type is not "4" the next record is read. A sequential counter is established. The field INSCTL is scanned for spaces. In no spaces are found, the program goes to the section to write the data area for this variable. If spaces are found, the pointers are set to pick up only the area of the record where there are nonspace characters. The output program disk file is written with a literal "FNT", and the sequential counter as the label, the literal "INIT" as the verb and the value of the field INSCTL as the instruction. The same process is done on the INSPOS field with a literal "POS", and the sequential counter as the label, the literal "INIT" as the verb and the value of the field "INSPOS" as the instruction.

The instruction disk file is then closed and the sequential disk file is opened. The source code that will display the screen layout to the end user is then generated and written to the source output program file. The source code to permit the end user to enter the data variables in the screen layout is then generated and written to the source output program file. This is only done if the user has indicated that a Phase II or Phase III form is to be generated by the entry of a phase selection number at the beginning of the program. Next, the source output program file is written with the source code that will send the printer environment to the printer and read the macro disk file which sends the form to the printer and retains it in memory until called upon by the page slew. The printer environment is sent to the printer by issuing a print statement that contains the printer environment that was established during the data area definition created previously. The code is written to the output program file to read the macro disk file. This is accomplished by opening the macro file using the form filename. A loop is established to read the entire macro disk file by setting up a counter. The macro disk file is read in 128 byte records sequentially adding "1" to the counter until the counter equals the same number as was extracted from the form record on the instruction disk file and written as MACRDATA in the data area definition of the output program file.

As each record is read, a print statement is issued to the printer containing the value of MACRDATA as read. When the two numbers are equal, the final read on the macro file is performed using the field MACRSAVE as extracted from the instruction disk file and written in the data area definition section of the output program disk file. This remaining data is also sent to the printer via the print statement. The macro disk file is then closed. The sequential disk file is closed and the instruction disk file is reopened. The phase selection number (previously input by the user) is checked for the value of "1". If the value is "1" the program transfers to the section of writing the instructions that will send the form to the printer. All other phase selections will establish the print statements for the data variables at this point. The next step is to write the instructions in the source output program file that will inform the printer of the number of copies to print and issue the page slew that drives the printer to produce the form. The production of the source output program file is now complete.

The source output program file is then compiled to generate the object code output program that is supplied to the individual workstations. The object code output program can then be run on the individual workstations without requiring each work station to be equipped with a applications software to design form. The individual workstations need only be equipped with an interpreter capable of running the object code output program.

The above-described system could be used, for example, in banking operations to print checkbooks for customers. A central office would use the central workstation to generate an object code output program that generates the check form. The object code output program is then supplied to branch offices which would generate checkbooks for customers as needed. The branch office would run the object code output program on an individual workstation, data variables such as customer name and account number could be input into a screen display, and the resulting check forms generated by a laser printer.

The invention has been described with particular reference to certain preferred embodiments thereof. It will be understood, however, that variations and modification are possible within the spirit and scope of the invention. For example, different programming languages and methods may be employed other than those illustrated. A single program could be used, combining the functions of the IPRINT software and the MAKEMAC program to generate the macro disc file and the instruction disk file. Also, other file structures may be employed.

What is claimed is:

1. A forms generation system comprising:
   a. first means for generating a form disk file;
   b. second means for reading said form disk file and generating a macro disk file and an instruction disk file based on data contained in said form disk file;
   c. third means for generating a screen layout disk file and a data variables disk file, said third means including means for calculating data position placement information of data variables, means for entering data types and data descriptions, and means for updating said instruction disk file with said data position placement information, said data types, and said data descriptions;
   d. fourth means for reading said form instruction disk file and said data variables disk file and generating a source code form program, said source code form program being capable of driving a laser printer to produce a form based on information contained in said macro file and said instruction file; and
   e. fifth means for compiling said source code form program into an object code output program.

2. A forms generation system comprising:
   a. at least one workstation having an input unit, a processing unit and a display unit;
   b. software control means for controlling said workstation to create an object code output program corresponding to a particular form, wherein said software control means includes means for generating a macro disk file and an instruction disk file, means for creating a screen layout on said display unit and generating a screen layout disk file corresponding to said screen layout, source means for generating a source code program corresponding to said form, and compiling means for compiling said source code program into said object code form program which is capable of driving a printing unit to reproduce said form based on the information contained in said macro disk file and said instruction disk file; and
   a printing unit coupled to said workstation and means for running said object code form program in said workstation to print said form with said printing unit.

3. A forms generation system as claimed in claim 2, wherein said software control means further comprises means for creating a screen layout on said display of said workstation and generating a screen layout disk file corresponding to said screen layout.

4. A forms generation system comprising:
   a. a plurality of workstations, including at least one workstation designated as a central workstation, said plurality of workstations comprising an input unit, a processing unit, and a display unit;
   b. software control means for controlling said central workstation to generate an object code output program corresponding to a form, wherein said software control means includes means for generating a macro disk file and an instruction disk file, means for creating a screen layout on said display of said central workstation and generating a screen layout disk file corresponding to said screen layout, source means for generating a source code program corresponding to said form, and compiling means for compiling said source code program into said object code program which is capable of driving said printing unit to produce said form based on the information contained in said macro disk file and said instruction disk file;
   c. at least one printing unit coupled to said plurality of workstations; and
   d. means for loading and running said object code output program in said plurality of workstations to drive said printing unit to produce said form.

5. A forms generating system as claimed in claim 4, wherein said plurality of workstations includes individual workstations and further comprising data transmission means for transmitting said object code output program from said central workstations to said individual workstations.

6. A method of generating forms comprising the steps of:
   a. reading a form input disk file containing data related to a predetermined form and generating a form macro file and a form input instruction file from the data contained in the input disk file;
   b. generating a screen layout disk file corresponding to a desired screen layout to be displayed on a display unit;
   c. generating a source code form program capable of driving a printing unit to reproduce said predetermined form based on data contained in said macro file and said form instruction file, and to selectively generate said desired screen layout based on data contained in said screen layout disk file; and
   d. compiling said source code form program to generate an object code output form program.

7. A method of generating forms as claimed in claim 6, further comprising the step of generating a data variable disk file to permit data variables to be input in said screen layout, when said source code form program is generated in step (d) to utilize said screen layout disk file.

* * * * *